Aug. 13, 1968  H. L. SCHÖNMANN  3,397,300
BIASING DEVICE FOR THE SLIDE CARRIAGE OF BUTT WELDING MACHINE
Filed Aug. 27, 1965
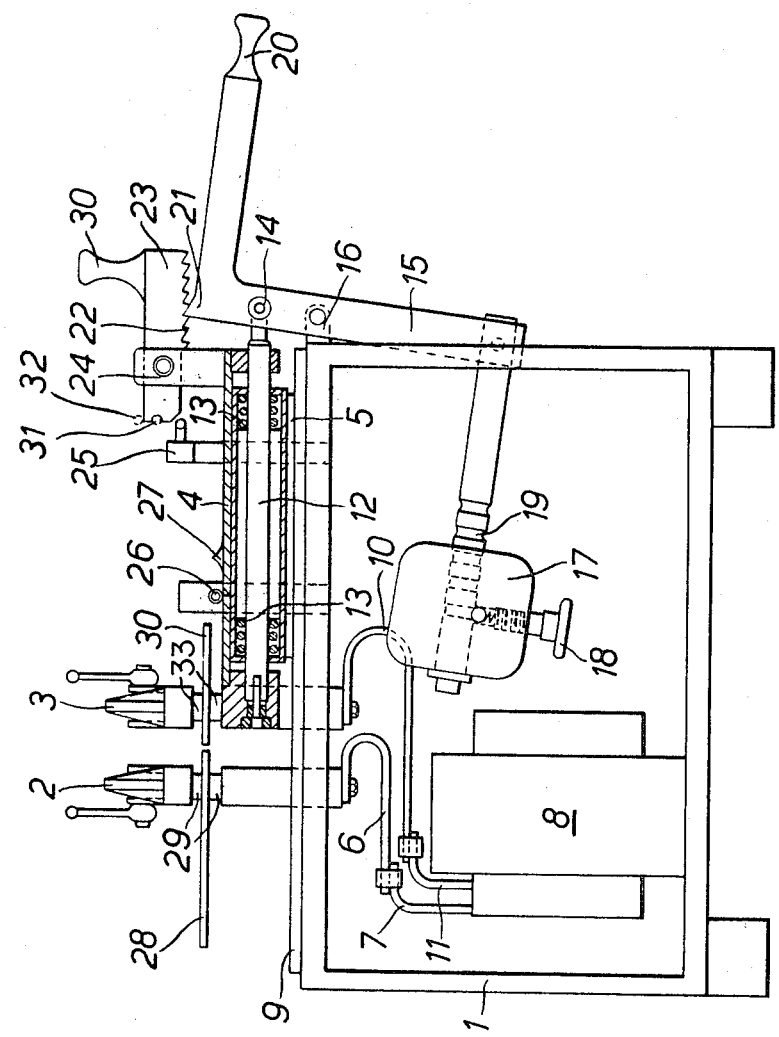

United States Patent Office 3,397,300
Patented Aug. 13, 1968

3,397,300
BIASING DEVICE FOR THE SLIDE CARRIAGE OF
A BUTT WELDING MACHINE
Hermann Ludwig Schönmann, Geroldswil, Zurich, Switzerland, assignor to H. A. Schlatter A.G., Schlieren, Zurich, Switzerland
Filed Aug. 27, 1965, Ser. No. 483,272
Claims priority, application Switzerland, Aug. 31, 1964, 11,334/64
5 Claims. (Cl. 219—101)

ABSTRACT OF THE DISCLOSURE

A biasing device for the slide carriage of a butt welding machine in which the advancing movement of the movable carriage is provided by the force of a weight mounted on a lever. This force is transmitted in a second rotating pressure moment to the movable carriage. A locking device blocks the advancement of the slide carriage, when the locking device is in its upper or unlocked position it controls the connection of the welding current. The termination of the current is obtained in relation to the preselected slide distance of the carriage in that a contact actuates a disconnection switch.

---

The invention relates to an improved biasing device for the slide carriage of a butt welding machine and more particularly to an adjustable pressure weight mounted for cooperation with a movable chuck and electrode assembly to bias it with a uniform, variable pressure toward the stationary chuck and electrode assembly and the abutting workpiece surfaces to be welded.

The biasing pressure is maintained substantially uniform to provide for all materials a welding operation of high quality, and the same biasing pressure may be continuously reapplied for any number of welding operations.

The advancing movement of the carriage in butt welding machines of higher capacity is usually produced hydraulically or pneumatically. In both cases the equipment is expensive because in one instance it is necessary to provide besides the press also a compressor for producing the compressed air, and in the other instance a set of pumps is necessary for circulating the pressure fluid. Furthermore, these two types of driving or biasing devices require sometimes complicated control systems.

This is also true in the case of slide carriages for butt welding machines which are moved by means of mechanical drives. For machines of smaller capacity one employs often a compression spring to effect the sliding movement. The disadvantage of this arrangement consists in the fact that a compression spring exerts according to its tension characteristics at the beginning of the welding operation a larger pressure on the welding joint than at the end of the welding operation. For a high quality welding the reverse would be preferable.

In the present invention the pressure transfer on the slide carriage is obtained in that the force of a weight mounted on the end of a lever produces a rotating pressure moment and this force is transmitted in a second rotating pressure moment to the advancing device of the slide carriage.

As the rotating moment of the weight and lever arm and its transmission ratio to the slide carriage remains the same for weldings of the same type, one can expect with the same friction conditions also the same reproducible weldings. The advancing of the slide carriage is produced when a locking device is released which is able to block the biasing or advancing pressure and this locking device controls the connection of the welding current which heats the workpieces clamped in the chuck jaws at the abutment joints and causes them to soften. The termination of the welding process is obtained in relation to the preselected slide distance of the carriage in that for example an adjustable contact stop actuates a terminal switch which controls the disconnection of the welding current. The termination of the welding process may also be obtained in a timed manner. In this case a time relay is started with the connection of the welding current and the time relay produces the disconnection of the welding current at the end of the preselected welding period.

The abutting pressure may be adjusted also depending on the requirements of the material to be welded by a sliding adjustment of the weight along the lever arm.

The novel features and advantages of the invention will become apparent from the following description taken in connection with the attached drawing which illustrates an example of a biasing arrangement for the slide carriage of a welding apparatus according to the invention.

The single figure of the drawing shows a butt welding machine in a front view with the front cover removed and the slide carriage guide in cross section.

The housing 1 carries on its top plate 9 a stationary chuck jaw 2. A movable chuck jaw 3 is mounted on a slidable carriage 4. The carriage 4 is electrically insulated from the housing 1 by a suitable insulation member 5. The stationary chuck jaw 2 is connected by means of a flexible current strap 6 to the secondary terminal 7 of a welding transformer 8. The movable chuck jaw 3 penetrates with a lower extension through an opening in the top plate 9 into the housing and is connected by means of the flexible current strap 10 to the secondary terminal 11 of the transformer 8. The movable chuck jaw 3 is connected to the push rod 12. The push rod 12 slides in the longitudinal ball bearings 13. The push rod 12 carries at its end remote from the chuck jaw 3 on a shaft extending through its longitudinal axis a roller pair which is journalled in a lever 15.

The lever 15 is mounted in a ball joint 16 fixed to the housing. The pivot point of the pressure lever is closer to the end remote from the weight to obtain a good leverage. The composite form of the lever is bent twice at right angles in opposite direction to have a substantially Z-shaped form. The end which extends into the housing 1 carries a weight block 17. The rotating pressure moment produced relative to the ball joint 16 may be extended in that the weight block 17 is moved along this lever arm. The weight block is clamped in position on the lever arm by means of a screw 18 which may engage in a groove 19 or by other suitable means. The end of the lever 15 remote from weight block 17 is provided with a handle 20. By pressing down on this handle the movable chuck jaw 3 may be brought into its starting position. Depending on the required abutting distance the handle 20 may be pressed down in a corresponding manner so that the latch portion 21 on the lever may engage between the desired teeth of the rack provided in the bottom surface of a control lever 23 to block the biasing force in the forward direction.

The control lever 23 is pivotally mounted on a support 24 which is fixed to the housing 1. The control lever 23 may be set in two positions 31 and 32 in its rotating movement. In the third position shown in the drawing the control lever 23 engages the latch portion 21 of the pressure lever due to its proper weight. In the position 31 the control lever has moved up so far that the rotating moment of the lever weight acts on the push rod 12 of the carriage 4. In the second setting position 32 of the control lever 23 the welding current is connected in that a limit switch 25 runs up on this lever. Similarly a cam 27 runs up on a terminal switch 26. The limit switch 26 is adjustable in the sliding direction of the carriage and is fixed to a support connected to the top plate 9. The cam 27 and the limit switch 26 are necessary only where the current is to be disconnected with a distance responsive disconnecting device. The workpiece 20 is clamped in the stationary chuck jaw 2 between the electrode pair 29. The workpiece 30 is clamped in the movable chuck jaw 3 between the electrode pair 33.

The working process of a butt welding operation according to the invention is described hereafter in greater detail.

Depending on the abutment pressure desired the weight block 17 is adjusted and clamped by means of the clamping screw 18 in the corresponding groove. Thereafter the distance between the two electrode pairs is selected depending on the type of material and on the cross section of the workpieces to be welded. In doing this the handle 20 of the pressure lever is pushed down. The lever pivots around the ball joint 16 and the weight block 17 is lifted so that the latch portion 21 may engage between the desired teeth of the tooth formation 22. In this manner the carriage 4 is pushed back by roller 14 and push rod 12 to the desired interval. In lifting the control lever 23 it is pulled out of engagement with the latch portion 21 of the pressure lever and is located in its first rest position 31. In this manner the pressure of the block weight 17 transmits itself over its lever transmissions as a pressure force on the two workpiece face surfaces. Upon further rotation of the control lever 23 into its second rest position 32 the limit switch 25 is actuated whereby the welding current is connected. The material at the face surfaces is heated and changed into a plastic state.

The slide carriage is urged forward by the weight pressure force so that the material is continuously abutted at the welding joint until the cam 27 actuates the limit switch 26.

The welding operation is thus terminated. The control lever 23 is set back down on the latch portion 21 of the pressure lever and the welded workpiece may be removed.

Although the invention has been described and illustrated by way of a specific embodiment it is clear that other forms and modifications may be employed without departing from its scope as defined by the appended claims.

What I claim is:
1. A biasing device for the slide carriage of a butt welding machine comprising in combination
   a stationary chuck and electrode assembly mounted on said machine,
   a movable chuck and electrode assembly mounted on said carriage at one end,
   a pressure lever pivotally mounted on said housing,
   a weight means supported on said pressure lever at one end,
   a pivot means fixed to said slide carriage,
   said pressure lever being connected to said pivot means at its other end,
   a pivot support mounted on said machine adjacent the other end of said carriage,
   a control lever mounted on said pivot support and having locking means for engaging said pressure lever at its other end on one side of said pivot means,
   electrical switch means mounted on said machine for engagement by said control lever at its other side upon pivoting movement of said control lever away from said pressure lever into a welding position,
   said pivoting movement of said control lever away from said pressure lever providing a constant uniform pressure of said pressure lever and said movable chuck and electrode assembly toward said stationary chuck and electrode assembly.

2. A biasing device according to claim 1 wherein the weight means is mounted slidably on said lever at said one end for adjusting the pressure of said lever at said other end against said slide carriage.

3. A biasing device according to claim 2 including control lever positioning means mounted on said machine for engaging and supporting said control lever in position before engaging said welding position in the pivoting direction away from said pressure lever.

4. A biasing device according to claim 3 including switch means mounted on said housing adjacent said carriage intermediate its ends and switch actuating means on said carriage for operating said switch means in a predetermined position of said carriage.

5. A biasing device according to claim 4 wherein said switch actuating means is adjustably mounted on said carriage.

References Cited
UNITED STATES PATENTS

| | | | |
|---|---|---|---|
| 564,331 | 7/1896 | Lemp | 219—57 |
| 1,145,642 | 7/1915 | Woodrow | 219—101 |
| 1,684,108 | 9/1928 | Phelps | 219—101 |

RICHARD M. WOOD, *Primary Examiner.*

C. CHADD, *Assistant Examiner.*